United States Patent [19]

Foudos

[11] 4,053,735
[45] Oct. 11, 1977

[54] ASSURED-CHECK COMPUTER-BASED BANK CREDIT DISBURSING SYSTEM

[76] Inventor: James N. Foudos, 2 Helm Court, Towson, Md. 21204

[21] Appl. No.: 602,769

[22] Filed: Aug. 7, 1975

[51] Int. Cl.$^2$ .......................... G06K 1/20; G06F 7/38; B44B 5/00
[52] U.S. Cl. .......................... 235/61.9 R; 235/61.7 B; 101/19; 340/152 R
[58] Field of Search .................. 235/61.9 R, 61.9 A, 235/156; 340/152, 172.5; 209/DIG. 16; 101/19

[56] References Cited

U.S. PATENT DOCUMENTS

| | | | |
|---|---|---|---|
| 3,183,829 | 5/1965 | Kreidich | 101/19 |
| 3,255,439 | 6/1966 | Simjian | 340/172.5 |
| 3,501,744 | 3/1970 | Simjian | 340/152 |
| 3,624,357 | 11/1971 | Wright | 235/61.7 B |
| 3,697,729 | 10/1972 | Edwards | 235/61.7 B |
| 3,819,921 | 6/1974 | Kilby | 235/156 |
| 3,891,830 | 6/1975 | Goldman | 235/61.7 B |
| 3,909,626 | 9/1975 | Balasubramanian | 235/156 |

Primary Examiner—Robert M. Kilgore
Attorney, Agent, or Firm—John F. McClellan, Sr.

[57] ABSTRACT

An assured-check computer-based bank credit disbursing system in which a bank-located unit or fixed unit transfers user-expendable credits to a portable unit for disbursement in check form by a user carrying the portable unit. A transfer code unique to each account of the portable unit must be entered in the fixed unit to activate it and the portable unit for the transfer. The user-expendable credits can be obtained from the bank in two ways on presentations of the portable unit to the bank by the user, namely, by cash payment to the bank and by loan from the bank; these are respectively designated as "cash" and "credit" when transferred by the fixed unit to the portable unit. The portable unit keeps in separate accounts the expendable balances of "cash" and "credit". The checks issued by the portable unit designate to which account each check is drawn as the checks are successively printed by the portable unit on proper manipulation of the portable unit keyboard by the user. Proper manipulation of the portable unit keyboard includes the entering by the user of a disbursement code unique to the individual user to activate the portable unit; regardless of manipulation, the portable unit will not issue a check overdrawing either account but will indicate the resultant negative balance. A tamper proof case is supplied to prevent fraudulent alteration of the portable unit accounts.

1 Claim, 8 Drawing Figures

ASSURED-CHECK COMPUTER-BASED BANK CREDIT DISBURSING SYSTEM

This invention relates generally to banking systems and specifically to assured-check systems.

In the prior art, mechanical postage meters charged at the post office have been known. Magnetic fare cards similarly are known to dispense fares up to a prepurchased total when presented to a complementary farebox. And small personal computers of the adding-subtracting variety can be purchased to keep a running balance of expenditures against a user pre-set to total, alterable at any time by the user, an example being the "CORVUS CHECK-MASTER" advertised as available from JS &A, 4200 Dundee Road, Northbrook, Illinois.

However, none of these systems nor any other which the present inventor has been able to find provides the advantages of the present invention, principal objects of which are:

to provide a banking system for issuing assured checks at any time or place which are acceptable as cash by any knowledgeable creditor;

to provide a system as described which affords the user a conveniently portable tamper-resistant unit for the check issuing, requiring for transfer of credits by a bank, pre-entry of transfer coding unique to the portable unit, and for disbursement of credits transferred by the bank, pre-entry of disbursement identification coding unique to the user, with temporary and total disablement of the unit on failure to enter the correct coding for disbursement in three user attempts;

to provide in said system means whereby the user can obtain transfer of user-expendable credits from the bank to the portable unit for disbursing by the user in assured-check form in two accounts, with balances separately displayed and separately expendable, one being a "cash" account and the other a "credit" account;

to provide a system as described which substitutes for cash while requiring personal identification, defeating criminal acts;

to provide a system as described which provides a portable unit in the size of a large "pocket" calculator, self-powered by a battery and with manually powered print mechanism actuation to make it independent of recharge for periods of a year or more.

to provide a system as described which is economical to build, fast, durable, attractive in appearance, nearly fool-proof and simple to use correctly, and which gives reliable results when used correctly.

It is to be especially noted that Applicant claims no invention in the individual components herein described which together make up Applicant's fixed unit and portable unit herein disclosed, since all the individual components have been deliberately chosen from among known-art devices. Likewise the coupling together of the components has been chosen to be conventionally done. The novelty and originality lie in the combination of the individual components described, or the equivalents of same, to comprise Applicant's whole system as claimed.

In brief summary given for cursive description only, the invention comprises a system including a bank-located or fixed unit, and a complementary user-carried or portable unit that has a check issuing mechanism responsive to a keyboard and error and overdraft preventing systems, and the system as a whole has tamper-prevention provisions.

The above and other objects and advantages of the inventions will become more readily apparent on examination of the following description, including the drawings, in which:

FIG. 7b is an isometric view of the unassembled configuration of a part indicated in FIG. 7a.

The drawings are now referred to in detail.

PHYSICAL APPEARANCE DETAILS, PORTABLE UNIT

Figure 1:
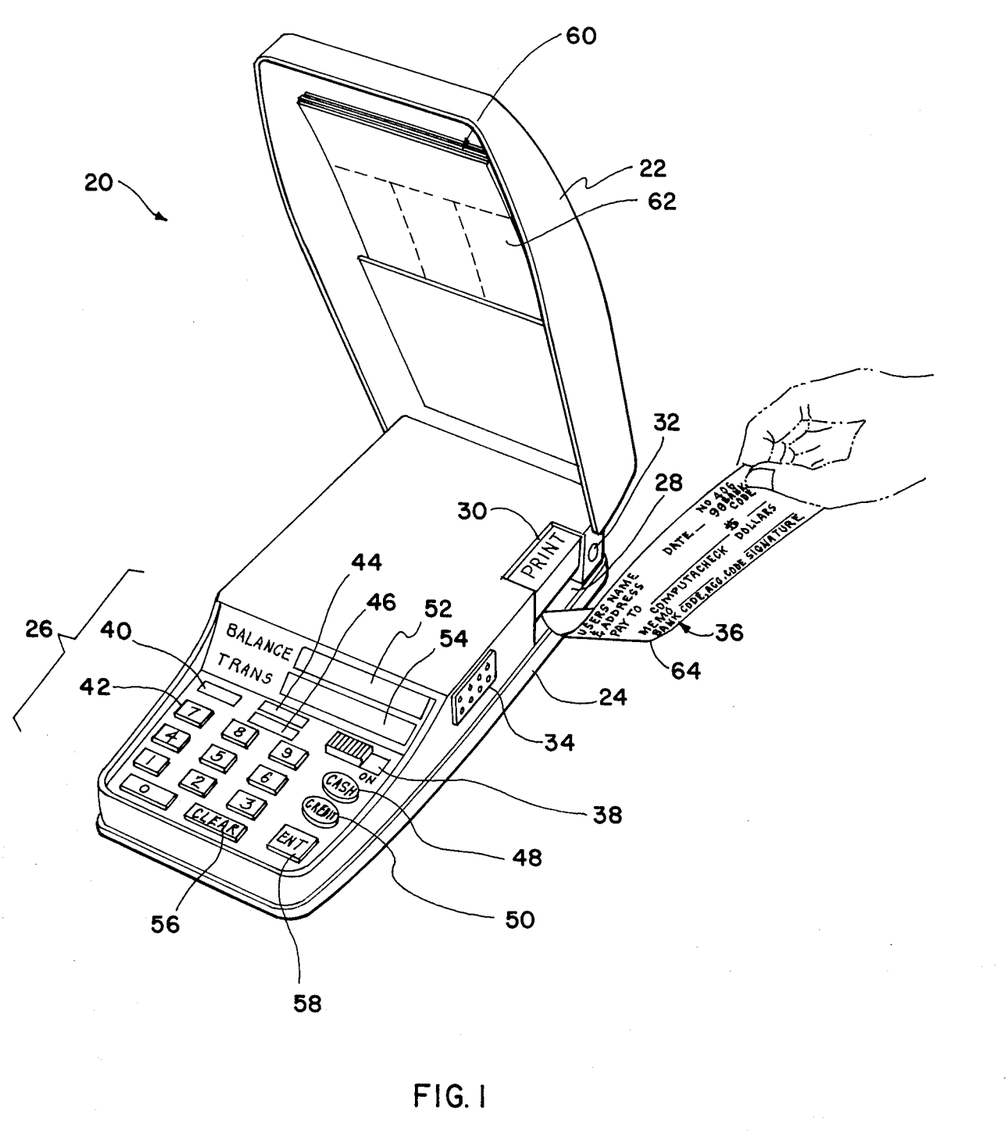
FIG. 1 is an isometric view of a portable unit.

FIG. 1 shows the portable unit 20 with the cover 22 of the case body 24 open, exposing the keyboard 26, check print slot 28, print key 30 above the slot, cover switch 32, check storage 60, input connector 34 which is an electric plug in connection, and a check 36 being taken from check print slot.

PROCUREMENT AND PREPARATION OF THE PORTABLE UNIT

Use of the unit is as follows: The user obtains the portable unit from his bank by lease or by purchase, and is given at the time a disbursement code, a numerical code number unique to his portable unit, which he must enter on the keyboard as a prerequisite to activating the portable unit on each occasion he intends to use it. By purchase or by contracting a loan with the bank, or both, the user has the bank transfer user-expendable credit to the portable unit, which the bank does through input connector 34 on connection with a complementary unit in the bank described later as the fixed unit. A transfer code unique to each account of each portable unit must be entered in the fixed unit to activate it, and to activate the portable unit to receive the transfer, assuring correct accounting. As part of the transfer operation the battery of the portable unit is also charged or recharged to the extent necessary.

MANIPULATION OF THE PORTABLE UNIT KEYBOARD

The portable unit is then ready for use. To make a purchase or other disbursement the user:

(a) opens the cover and (b) closes the on-off switch 38. In response the "enter I.D." window 40 illuminates, notifying the user that he must enter his identification code number, sometimes called in this description the disbursing code number.

The user then: (c) enters the code number on the numerical keys 42 of the keyboard. The portable unit compares the number entered with a code stored in a non-volatile memory in the device. If the code number entered is correct, the "enter I.D." light goes out.

If the disbursement code number entered is incorrect, the portable unit power turns off for a predetermined period, such as 60 seconds. The third successive turnoff from this cause requires resetting at the bank to restore power to the unit.

Once the correct disbursement code number has been entered the "cash" indicator 44 and the "credit" indicator 46 lights begin flashing alternately, signalling the user to select an account by depressing the "cash" key 48 or the "credit" key 50.

If at this point the user desires to see what expendable amount, or balance after any prior disbursements he may have made, remains in the cash account, the account to which his banktransferred user-expendable credit in return for his cash payment to the bank, he depresses the "cash" key 48; the balance in that account is then displayed at the balance display window 52, and the "cash" indicator remains on. In similar manner, if he wants to see what expendable amount or balance remains in the credit account, the account to which his bank transferred user-expendable credit in consequence of a loan the user, contracted for the purpose with the bank, the user depresses the "credit" key 50 and the balance is displayed at the balance display window 52 and the "credit" indicator remains on.

To draw a check, the user (d) depresses the appropriate key designating the cash account or else the credit account, if he has not previously done so, and then: (e) punches-in the intended check amount on the keyboard.

A sequential-entry system is preferably provided according to the following well known calculator art features.

The amount of the transaction is entered into the device preferably using a ten-key keyboard as illustrated. The user depresses the pushbutton switches in the order of decreasing significance. For example, to enter $57.43 he depresses 5, 7, 4, 3, in that order. Decimal point position is automatically established in the device because the last two digits entered are the 10 cent and the 1 cent value respectively. This will require that the user depress two zeros for round dollar transaction, i.e. $100.00 depress 1, 0, 0, 0, 0. The completed amount appears in the "transaction" display 54, in the order entered. The last number entered always appears first in the cent column and shifts left when a succeeding number is entered. Thus, in the $57.43 example, when 5 is entered it first appears as 5 cents. Next when 7 is depressed the number showing is $.57. After the 4 switch is pushed the transaction display will indicate $5.74. Finally the 3 is entered completing the process. The user now has a chance to review what he is doing. At this time, or at any prior time after completing the ID sequence, it is possible to clear the selected mode and the value of the transaction by pushing the "CLEAR" Key 56.

The system reverts to the flashing cash-credit indicator lights when cleared. This feature permits correction of the transaction value or change in the selected account. If the user is satisfied that he has entered the correct amount and is drawing on the proper account he then: (f) depresses the "Enter" key 58.

Depressing the "enter" key has the effect of deducting the transaction from the balance. The new balance appears in the "balance" display, the transaction display goes out, and the cash or credit indicator remains on indicating which balance is being displayed, all in accordance with well known calculator design principles. The portable unit is now ready to imprint the transaction value on the check. The new balance is stored in a non-volatile memory in the unit, ready to appear on the balance indicator following check imprinting. At this point, and until the check is actually imprinted, the transaction value is also stored in the non-volatile memory. This is a safety feature to prevent loss of the transaction value if the user inadvertently shuts off power, either by the power switch or by closing the cover, actuating automatic shut-off switch 32 before the check is imprinted. For the simplest embodiment of this invention, the process of imprinting the check will remove the transaction value from the memory. For more complex configurations in optional embodiments the amount of the check can be maintained in storage for later readout and processing at the bank according to well known principles.

If the amount entered for the transaction exceeds the balance, the balance display will blink on and off and no activity such as "enter" or "print" can take place. The only activity that the device will then respond to is depression of the "clear" pushbutton switch, permitting the other account in the unit to be utilized.

IMPRINTING THE CHECK

Assuming that the user has correctly entered his transaction, within the balance of his particular account, he next: (g) detaches from the check form supply 60 in the cover a check form 62 and: (h) inserts it, proper end first and face down, into the horizontal slot 28 in the side of the unit, and: (i) depresses the "print" key 30 above the slot. By means to be described later, this clamps the check form in place, advances it for printing and prints on it the first digit of the amount entered. In like manner, successive depressions of the "print" key advance the check and print the preselected digits on it, in proper succession, one at a time, until the numerical amount entered on the keyboard has been reproduced on the check.

In addition to the variable check amounts, the check imprinter system of the portable unit may also imprint on the check a notation, which may be coded for the benefit of the user, designating the account on which the check is drawn, to facilitate reconciling his accounts, as well as notations desired by the user for other purposes, such as date and check number in optional embodiments.

CHECK CHARACTERISTICS

As shown by the check 36 being removed from the slot in the portable unit after imprinting with the amount of the transaction, the check size and layout are conventional and fully compatible with existing banking practice.

In the central part of the check where the check amount is usually printed by check printers, is the portable unit imprint area.

Preprinted on the check in the usual positions are the user's name and address, the bank name, a customer account number, and the usual federal reserve identification notation.

Spaces are designated for handwritten entry by the user of the date, the payee's name, the memorandum of the nature of the transaction for which the check was issued, the user's signature, and, most importantly, above the user's signature in the usual place is the area for the user to handwrite the amount, confirming that he is aware of the amount imprinted on the check in the designated space 64 by the portable unit. When the payee has observed the placing of an unimprinted check form in an intact portable unit, the imprinting of the check, and the duplicative handwritten entry of the amount over the signature of the user, he is assured that the check is guaranteed by the bank and payment to him is as certain as if by certified check.

The exact nature of the check material employed depends on the type printing head employed. One exemplary type check material, thermally responsive paper similar to the well known "Thermofax" paper, is discussed below in discussion of an exemplary type printing head, following the discussion of the block diagrams of the system.

BLOCK DIAGRAMS OF THE SYSTEM

Figure 2:
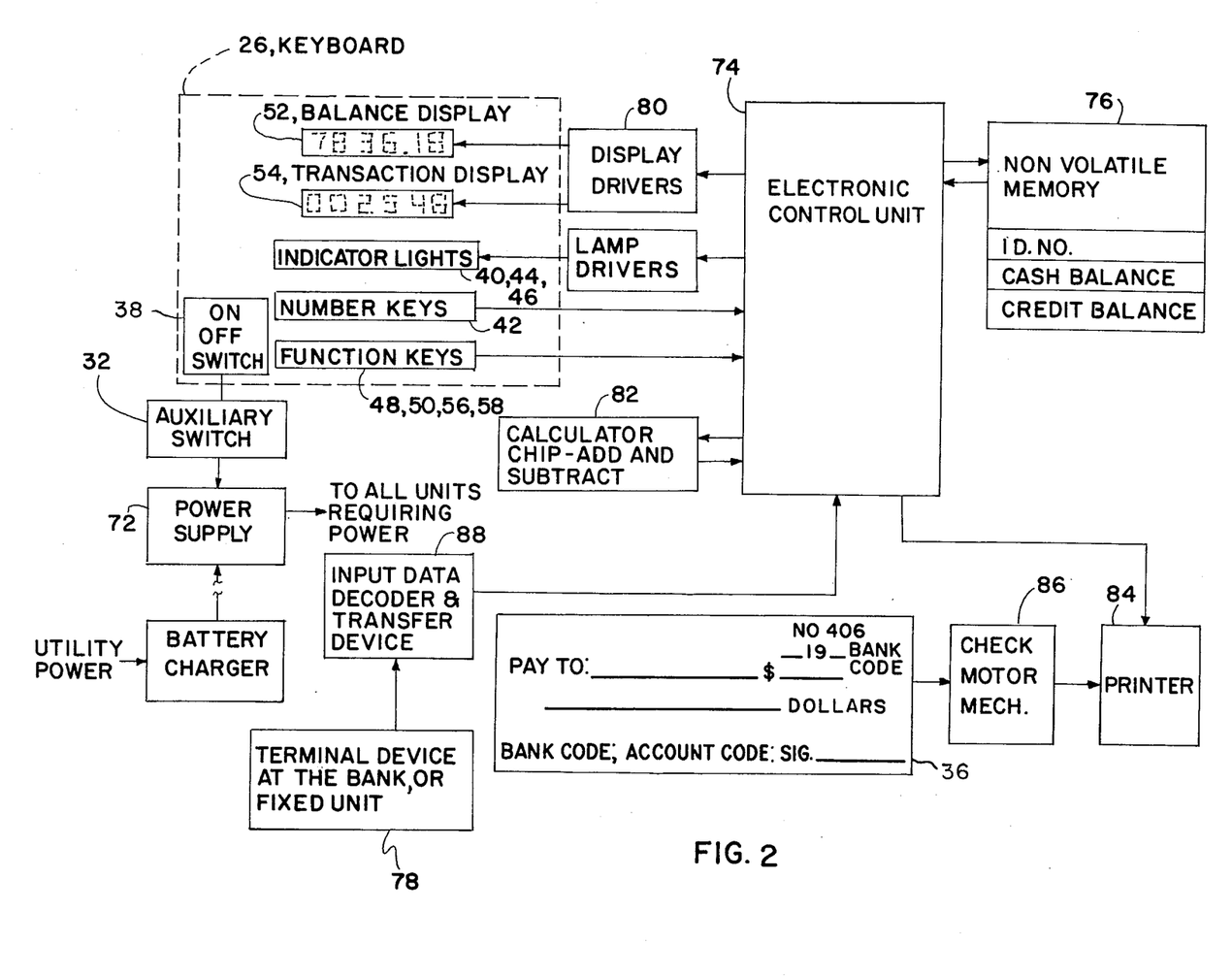
FIGS. 2 and 3 are block diagrams of electrical circuits.

FIG. 2 is an overall block diagram of the system.

The user operates the device, as noted, from the control panel displays and controls or keyboard 26. This contains the power on-off switch 38, function key pushbuttons 48, 50, 56, 58; numeric data entry key pushbuttons 42, indicator lights 40, 44, 46, and the two numeric displays 52, 54. The use of the pushbuttons and displays was discussed in the operating description above.

The power switch 38 activates the battery power supply 72 for the unit. Auxilliary switch 32 is incorporated in series with the on-off switch so that when the cover is closed, the power is automatically turned off. The battery power supply preferably contains rechargeable batteries, Ni Cad or equivalent, rechargeable by a conventional charger operating on utility power such as 115 volts, 60 hz. single phase or an equivalent source available in the region where the system is used. The power supply furnishes power to all parts of the portable unit.

The electronic control unit 74 is a conventional micro-processor and acts as a central controller and data processor. It monitors all input transducers in the system and controls the flow of data for storage, calculation, printout or display. It contains an oscillator for use as the system clock to implement the data monitoring and transfer functions.

The non-volatile memory 76 has two major categories of major information stored. The first category comprises the transfer codes or unique account codes used by the bank in entering credits into the portable unit from the fixed unit to insure that only the proper portable unit will accept entries to the account of the owner, are contained in protected portions of the memory. Only the user of the portable unit will receive the proper code for activating the device. The second category of information is, of course, the remaining balance. This information will be altered in the non-volatile memory after each transaction. Two categories of the remaining balance data will be kept by the device, the "cash" account balance, and the credit account balance. These balances will be correspondingly decreased during the process of any transaction in a respective category which results in a check. The balances will be increased, as appropriate, by entering data from the fixed unit or bank terminal device 78.

As indicated above, two displays are used to indicate numerical information pertinent to the transaction. The display at 52 indicates the number representing the available balance in the selected cash/credit category. The second, the display at 54, indicates the value of the transaction as entered by the user of the portable unit. This enables the user to evaluate the transaction and to verify his entry of the amount to be disbursed. The "clear" function key 56, can be used to remove errors and re-enter the selected data as further noted below. Display drivers 80 compatible with the numeric readouts are well known to persons familiar with the art.

The addition and subtraction of the value of the transaction is accomplished in a calculator chip 82. Suitable devices of this nature are commercially available for use in pocket calculators. The calculator chip operates under the influence of the electronic control unit and is chosen to have capacity sufficiently large to be compatible with the nonvolatile memory and the numeric displays. All arithmetic, display and memory is conventionally performed in Binary-Coded-Decimal form, for the numeric functions of the device. The calculator chip may optionally be part of the microprocessor, the electronic control unit 74.

The printer 84, used to enter the transaction amount on the check is a commonly available thermal printer of the dot matrix type. The printer which is described in greater detail hereinafter operates under the control of the electronic control unit, and in conjunction with the check motion mechanism. The check motion mechanism 86 is, as will be seen, hand operated to conserve battery power. The check 36 is manually inserted into the check motion mechanism.

User-expendable credit is entered into the portable unit at the bank, or similar agency, from the fixed unit via the input data decoder and transfer device 88 in the portable unit. As stated earlier, a unique account code or transfer code is entered via this device to establish identity of the user/credit receiver. The transfer device or fixed unit 78 of the bank is then modulated with the amount to be entered and with the category, cash or credit.

One preferred embodiment of the input data transfer device conventionally uses tone encoded pulse modulation techniques to transfer the data in the manner of telephone mechanisms. The tones may be inductively coupled between the bank transmitter in the fixed unit and the receiving components in the portable unit, in order to avoid the complication associated with making electrical connections.

Direct electrical connections are, however, an alternate means of transferring the signal between the devices and for simplicity are indicated in the first Figure, however combinations of tones and pulse coding of the tones may be used in accordance with known art for more secure communications which are difficult to emulate, further inhibiting tampering in an effort illegally to enter deposits into the portable unit.

The fixed unit in the bank can readily be made in a form suitable for generating the tones and pulse modulating them with the necessary unique identification or transfer code for each account and the amount to be transferred to the portable unit. This bank part of the system, can be under control of the bank's computer or can be manually operated, both well within known art. The remainder of the input data decoder and transfer device 88 in this case would consist of tone decoding filters. The outputs of the filters would then be the pulse encoded information for use by the electronic control unit in conjunction with the non-volatile memory.

Figure 3:
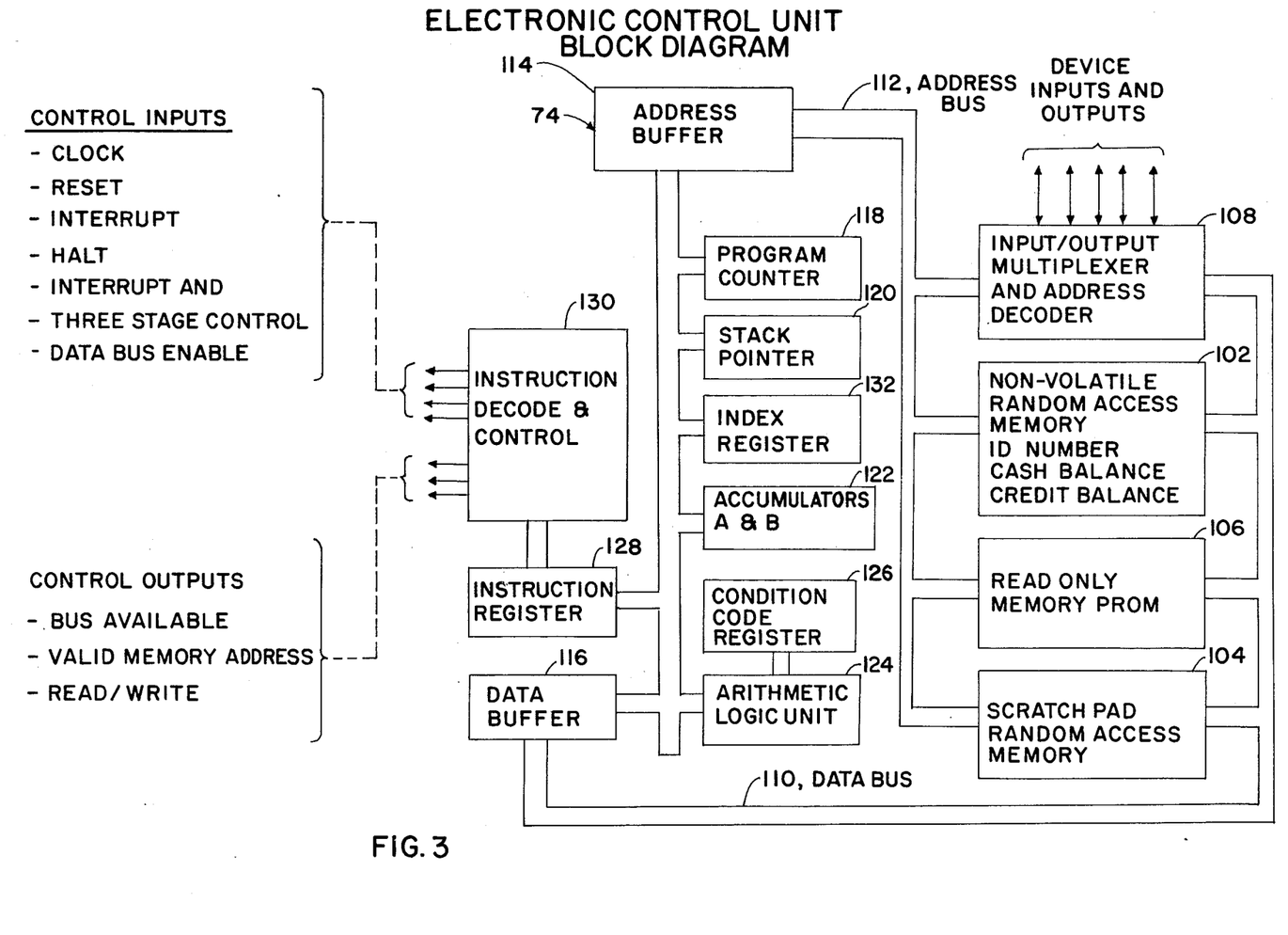

FIG. 3 diagrams the electronic control unit.

The following is a discussion of the electronic control unit, one embodiment of which is based on a four bit microprocessor such as the Intel 4040 or similar commercially available device. A central processor unit (CPU) acts as the central control portion of the microprocessor. It is supported by random access memory (RAM) 102, 104, and programmed read only memory (PROM) 106 and some associated interface components. These concepts are well known to practitioners of the art. The control program of the microprocessor is resident in the PROM and is executed via the CPU. Computation is accomplished using the RAM. The processor is activated by an external clock which synchronizes the operation of the system. The clock is the result of counting a free running oscillator circuit.

Devices peripheral to the microprocessor are the display driver, non-volatile memory, printer which are mainly system outputs. These outputs are addressed by the microprocessor via an address decoder and data multiplexer 108 which steers the data from the microprocessor to the appropriate device by identifying it with a unique programmed address. Similarly the inputs to the system are associated with address codes. These include the keyboard, non-volatile memory outputs, bank signal decoder, etc. The address decoder and data multiplexer is also used in input data to the microprocessor system.

The non-volatile memory can also be of several types. It must be non-volatile as the name implies in that it does not loss the stored data when the portable unit is turned off. It is well known but differs from the ordinary PROM because the contents of the memory must be alterable, as described earlier, in order to keep track of the current balances. A static, random access memory will ordinarily be used, of the type that can be maintained by applying a minimum amount of standby power. The input/output multiplexer and memory registers are serviced from the CPU by a Data bus 110 and an address bus 112. The data bus is bidirectional in that data can flow from the processor to the input/output devices or to the RAMs. Data can also flow from I/O devices, the RAMs or the PROM back to the processor. The address bus, on the other hand, is unidirectional, addresses are transmitted from the processor to the memories and the I/O multiplexer to identify instruction and data locations. The address lines and the data lines are buffered for typical application by an address buffer 114 and a data buffer 116 respectively.

A number of registers are used to operate the processor which forms the operating portion of the electronic control unit. The program counter 118 is used to keep track of the address of the next sequential instruction for use by the CPU. This will normally be a location in the programmed ROM where the processor program is stored. The stack pointer 120 is a register which maintains an address for storing or retrieving data from the scratch pad RAM. The stack pointer is associated with processor program instructions whose temporary storage is desired and the information stored is available on a last-in, first-out basis. This is used to service interrupts or during the processing of subroutines for example. A special area on the scratch pad RAM is designated to be the "stack". The Index Register is available in most CPU's and is used for the indexed mode of memory addressing, or it can be used to store data. The accumulator 122 generally is provided as an A and a B section for precision. It is used to format data for the data bus. The arithmetic logic unit 124 will be used to perform the addition and subtraction mathematical operations required to compute the current balance in the cash or credit account. Since the processor cannot generally subtract, the program will provide for taking the complement of the subtrahend and adding to implement the subtraction process. This complementary operation can be done in one of two ways, depending on the particular CPU selected. One way is to form the complement by a series of software step i.e. stored program in the PROM; the other is to provide a hardware complementer as part of the CPU. A condition code register 126 works in conjunction with the arithmetic logic unit (ALU). This register keeps track of whether the operation resulted in a carry, was greater than or less than zero at its completion, and similar data relative to the result of the arithmetic operation. This information is then used to make decisions in the processor program. The instruction register 128 together with the instruction decode and control 130 act to store and interface the instructions and commands respectively. Typically inputs and outputs are listed on the left side of the figure. These inputs and outputs for processor and device control will vary slightly for different manufacturer's CPUs but generally perform similar system requirements.

Each supplier of commercially available processors provides a family of accessory devices compatible for use as a system. One example is the Motorola M6800 series consisting of a MC6800 microprocessor, an MCM6830 ROM, MCM6810 RAM, MC6820 Interface Adapter. The items designated by reference numerals 114 through 130, and the index register 132 may be procured as part of the MC6800 CPU.

THE PRINTING SYSTEM STRUCTURAL COMPONENTS

After a check form is inserted in the slot on the portable unit, it is indexed and, as said, stepped manually, and the numbers representing the amount or value of the check are imprinted on it, following which it is removed from the portable unit, written on as described, and used for disbursement.

These are a number of implementations possible for the check imprinting device as well as even more possibilities for the check motion or indexing means. These possible implementations are apparent to those skilled in the art and include commercially available character printers. The motion mechanism can, for example, be powered by electrically operated stepper motors or mechanically by a wound spring driving an escapement device to achieve stepping. The implementation discussed below serves to illustrate the desired effect.

The value of the check is imprinted upon the check by a device which produces clear permanent and unambiguous markings, which, in this disclosure, will be assumed to be arabic numerals denoting the amount payable. This device will be hereinafter referred to as the "printer". In the embodiment of the invention described in this disclosure, the printer comprises two subsystems. The first subsystem is the printing head, which is the device that produces representations of Arabic numerals upon the face of the check. The second subsystem is the transport mechanism, which assures that the several Arabic digits are imprinted in the proper sequence. The operating principles of these two sub-systems, and the ways in which they are related to one another and to the remainder of the system, are as follows:

The printing head incorporated in the embodiment described herein is the kind generally known as a "thermal printer". This kind of printing head, which is in wide current usage, employs a special paper which has the property of displaying a permanent mark when subjected briefly to an elevated temperature. The paper, known as "thermal paper", is used in conjunction with a print head which produces a controllable and highly localized region (or pattern of regions) of elevated temperature. When the print head is placed in contact with the thermal printer and appropriately energized, a permanent mark is produced upon the paper. The configuration of this mark accurately duplicates the configuration of the heated region of the printing head. In the most familiar kinds of thermal printers, the printing head consists of a geometrically regular array of individual elements, each of which can be heated for producing a corresponding mark upon the thermal paper. The embodiment of the invention described herein utilizes a printing head which contains 20 elements arranged in a rectangular array which is made of four vertical columns each containing five elements. All elements are spaced at approximately equal intervals. These elements are individually controlled. By properly selecting these elements in the 20-element array which are to be heated and thereby impress corresponding marks upon the thermal paper, it is possible to produce at will a recognizable and unambiguous representation of any one of the 10 Arabic digits thereon. A suitable print head is P/N DC-1145-B, manufactured by Displaytek Corporation of Dallas, Texas.

Since the embodiment of the portable unit described herein contains a print head capable of producing only one character at a time upon the check, and since several characters arranged in sequence are required to denote the value of the check, a means is required to move the check with respect to the print head so that the several required characters can be imprinted in their correct relative locations.

(An alternative embodiment contains a print head which is capable of producing all of the required characters without the need for relative movement of the check and the print head. While this concept is well known in the art, it is significantly more costly than the simpler embodiment described in this disclosure, and since low cost is highly important to the purpose of this invention, this alternative embodiment will not be discussed further).

The transport mechanism aligns the check in its correct initial position with respect to the print head, advances the check to the proper position for imprinting the next digit in the printing sequence, and provides an electrical signal which causes the print head to imprint the appropriate digit upon the check. The transport mechanism described in this disclosure is operated by means of manually applied pressure upon a pushbutton or key. Each time the key is depressed, the check is advanced one space and a single digit is imprinted upon it.

Figure 4:
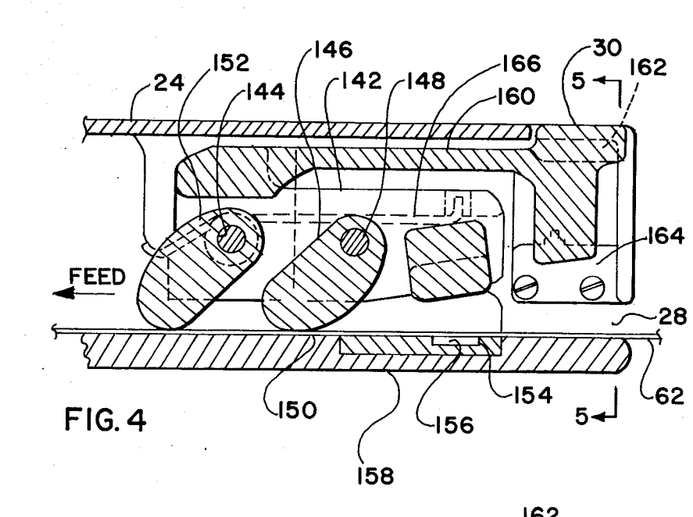
FIG. 4 is a fragmentary side elevation in section taken at 4—4, FIG. 5.
Figure 5:
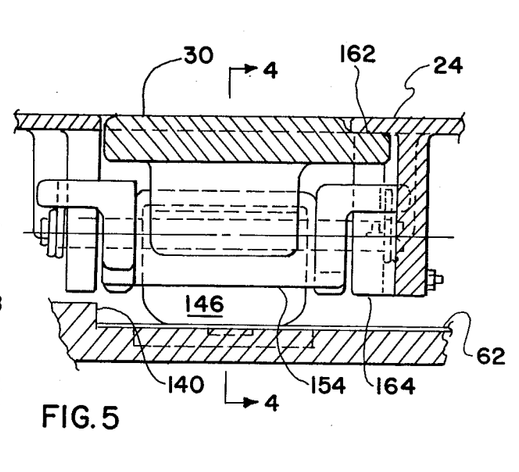
FIG. 5 is a fragmentary front elevation in section taken at 5—5, FIG. 4.
Figure 6:
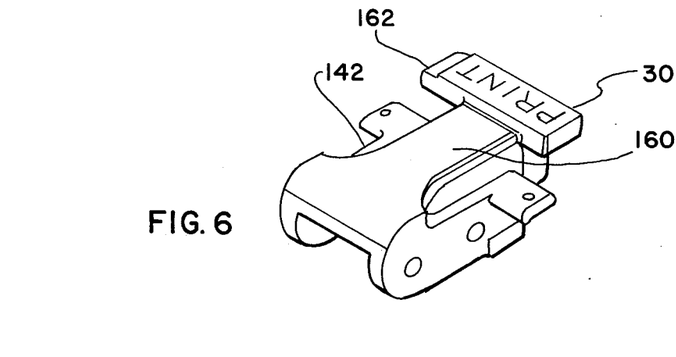
FIG. 6 is an isometric detail of a part which appears in FIGS. 4 and 5.

FIGS. 4, 5 and 6 are respectively two fragmentary sectional views which illustrate the essential parts of the printer and an isometric sketch on a reduced scale of the actuating lever.

The check form 62 is placed in the printer by inserting it, face down, into a horizontal slot 28 in the housing 24 of the portable unit. The housing incorporates a guide 140 (shown in FIG. 5) which assures that the check is properly aligned in the printer.

Operation of the printer, after the check has been inserted, is initiated by depressing the "Print" key 30. This action rotates the actuating lever 142 of which the key is an integral part, about its fixed pivot 144. As the actuating lever rotates, the feed pawl 146 is pressed against the check and is forced to rotate about its own pivot 148 which is contained within the actuating lever. This rotation of the feed pawl pushes the check in the direction indicated in the Figure. The lower surface of the check slides over the platen 150 which is flat and relatively slippery to assure that the check will slide upon it, when urged forward by the feed pawl. As the check advances, it slides without significant resistance beneath the holding pawl 152.

When the check has advanced a distance equal to the required spacing between the digits to be imprinted, the free end of the actuating lever 142 has been depressed sufficiently that the resilient pressure pad 154, fixed to the actuating lever, contacts the check. This contact halts the advance of the check and also, under continued manual pressure upon the key, presses the check into intimate contact with the active portion 166, of the print head 158, which is recessed into the platen. Increased pressure upon the key then causes it to depress farther by elastically bending the arm 160 by which it is attached to the actuating lever. This additional movement of the key brings the tab 162 into contact with the switch 164 and thus actuates the switch, which thereupon provides a signal that triggers the electronic control unit to command the print head to imprint the appropriate digit upon the check by supplying current heating appropriate elements of the printing head array.

When the pressure upon the key is released, the return springs 166 push the actuating lever back to its initial position. During this return stroke, the feed pawl moves without significant resistance over the surface of the check, while the holding pawl prevents the check from moving backward. Depressing the key again will advance the check one more discrete increment and imprint another digit upon it. The above-described sequence of actions is repeated until all required digits have been imprinted.

TAMPERPROOF CASE

Figure 7A:
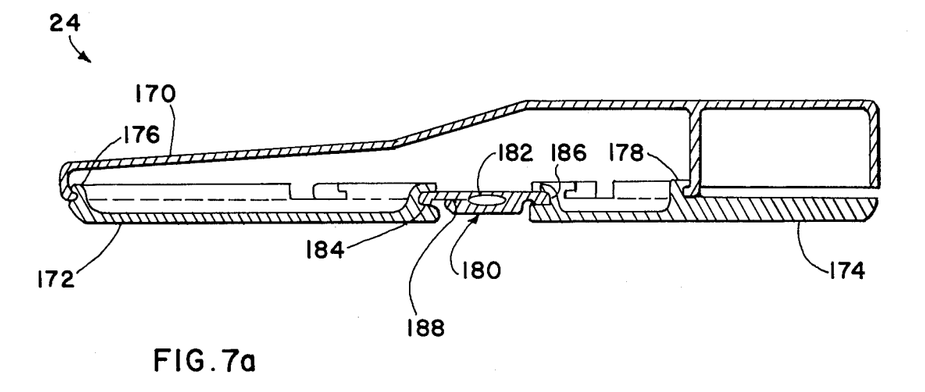
FIG. 7a is a schematic side elevation in section of a portion of a case or housing such as that in FIG. 1.
Figure 7B:
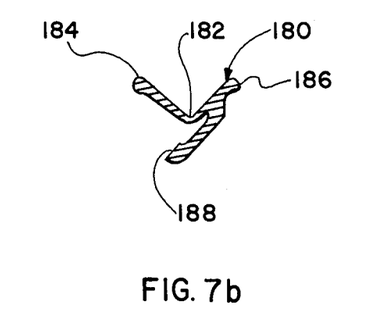

FIGS. 7a and 7b illustrate exemplary tamperproof case structure, according to prior known art, for the portable unit All the components of the portable unit which might otherwise be vulnerable to fraudulent tampering are enclosed within a tamperproof case of this nature. Should it become necessary for the case to be opened for repairs, the user must return the device to the bank for authorized repair. The bank will monitor the servicing of the device to whatever extend may be required to insure that no transaction is made fraudulently affecting the user's account.

This concept is based upon the principle that the case cannot be opened without destroying one or more of its component parts. It is so designed that, by using the correct technique, one specific part can be easily cut and removed and then easily replaced by a new part when the case is reassembled. This part is designed to be so inexpensive that its cost will not significantly affect the total cost of the servicing operation. In addition, its configuration precludes not only the possibility of accidental damage but also assures that replacement or repair by unauthorized persons would be extremely difficult.

The case 24 comprises diagrammatically a one-piece upper portion 170, and a three-piece lower portion. The front piece 172 and the rear piece 174 of the lower portion are connected to the upper portion by means of interlocking tabs 176, 178. These tabs are so configured that they may be disengaged by sliding the front piece rearward and the rear piece forward. The case is locked by inserting a center piece 180 between the front and rear pieces to prevent their being moved to disengage the tabs. This center piece is designed as an extrusion made from thermoplastic material.

FIG. 7b shows the centerpiece 180 in the configuration assumed in the free or unassembled state.

Assembly of the case is begun by installing the front and rear pieces of the lower portion and sliding them until the tabs engage. The tabs prevent relative motion in all other directions. The center piece is then inserted in the space between the other two pieces. The center portion 182 of the center piece is relatively thin, allowing it to be bent by hand for insertion. When pressure is released, the cylindrical ends 184 of the center piece will enter the mating grooves 186 in the front and rear pieces. At this time, a small quantity of suitable quick-setting adhesive (such as cyanoacrylate) is applied to the sealing surface 188 of the center piece. Manual pressure is then exerted against the center piece, which is thereby forced into the seated position. When the adhesive has set, the center piece will be permanently entrapped between the front and rear pieces. The case will therefore be sealed in such a way that it cannot be opened without destroying one or more pieces. For authorized service operations, it is opened simply by cutting the center piece along its centerline with a heated blade such as is commonly used for cutting thin thermoplastic materials. The resulting halves of the center piece are then readily removed, after which the front and rear pieces are slid toward one another to disengage the tabs and then also removed.

Obviously many variations are possible within the scope of this invention. For example, it will be apparent to those skilled in the art that a simple stepping delay-relay circuit may be employed as means for affording the user time-spaced plural opportunities to enter the proper disbursement code and then disabling the device upon the user's repeated failure to enter the proper disbursement code.

It is, therefore, to be understood that within the scope of the appended claims the invention may be practiced otherwise than as specifically described.

What is claimed and desired to be secured by United States letters patent is:

1. A banking system for controlling the dispensing of data, representing amounts of guaranteed credits, usable in purchasing transactions and the like, comprising: a fixed unit for retention under bank control in a bank, a portable unit for carriage by a user of banking services of said bank for use in making purchases; connective means for transferring data, representing banking credit amounts, from the fixed unit to the portable unit to prepare the portable unit for use in making purchases, including means on the respective fixed unit and portable unit for uniquely associating the fixed unit with the portable unit as a prerequisite to said transfer of data, representing banking credit amounts, means in the portable unit for selectively limiting operation of the portable unit to a particular user, including: means in the portable unit for demanding entry of a user-identifying disbursement code into the portable unit, means associated with said means for demanding for affording a predetermined number of opportunities at spaced times for correct entry of a said disbursement code, means having association with said means for affording for disabling the portable unit upon failure of a correct entry of a said disbursement code following said predetermined number of opportunities; means in the portable unit for dispensing said data, representing banking credit amounts, from the portable unit upon correct entry of a said disbursement code, including means for imprinting amounts on check forms; means having association with the dispensing means for preselecting data, representing banking credit amounts, to be dispensed in respective transactions; means having association with the preselecting means for selectively designating data, representing banking credit amounts, dispensed as cash transactions or charge transactions; including means for signalling requirement for predesignation of data, representing banking credit amounts, to be dispensed as cash transactions or charge transactions and means for preventing dispensing in excess of the banking credit amount balance represented by data in the portable unit, means for indicating data, representing banking credit amounts, involved in each transaction, and means for indicating data, representing banking credit balance, in the portable unit prior and subsequent to each said transaction.

* * * * *